Feb. 8, 1949.  A. A. BROWN  2,461,308
MACHINE FOR ASSORTING EGGS ACCORDING TO WEIGHT
Filed April 4, 1947  2 Sheets-Sheet 1
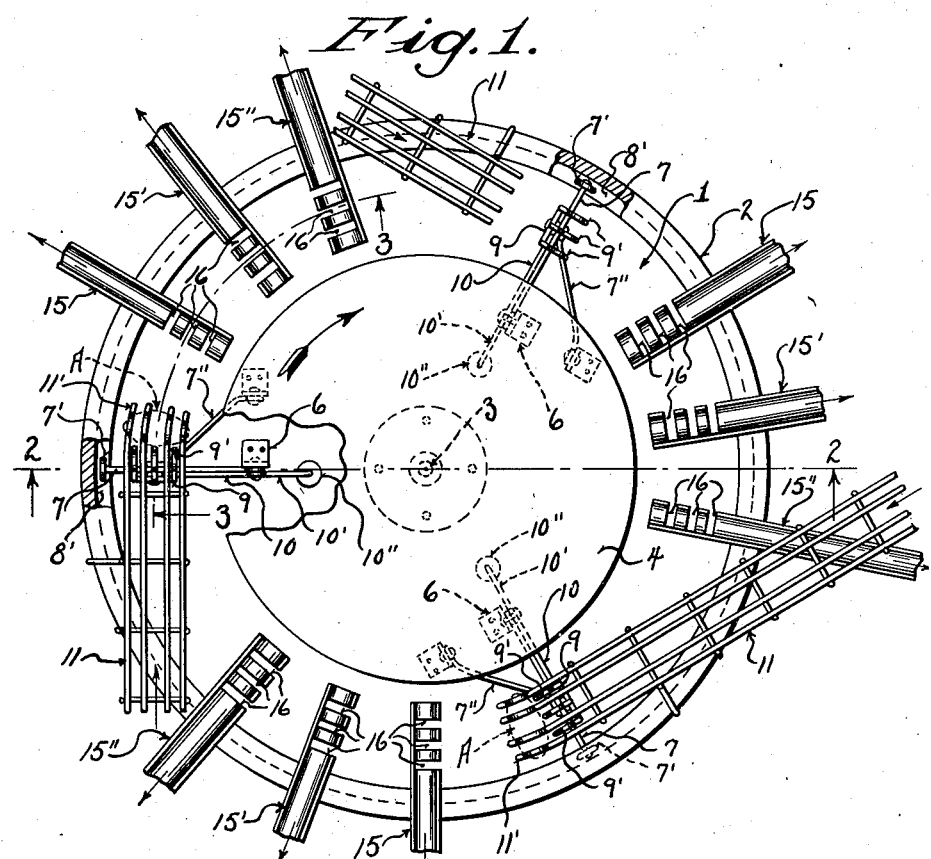
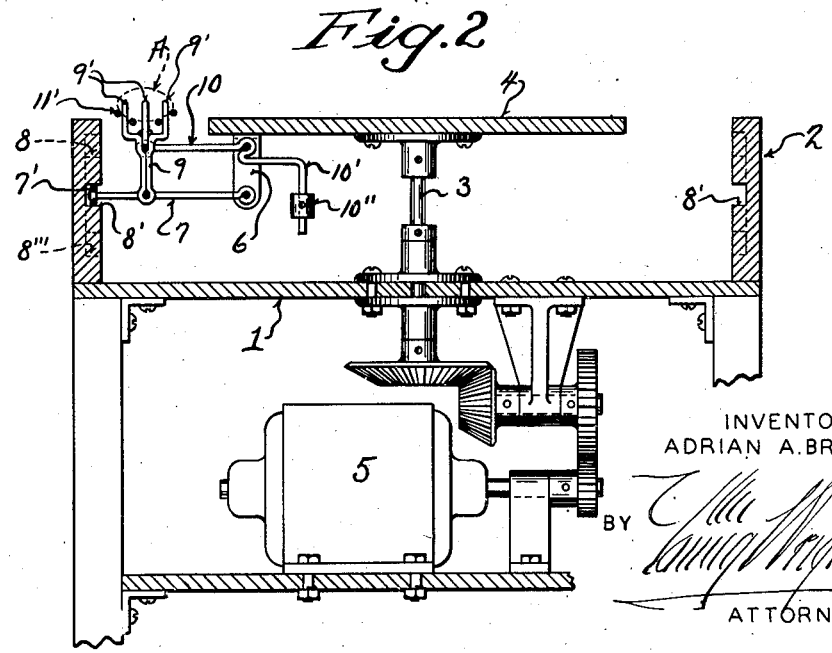
INVENTOR
ADRIAN A. BROWN
ATTORNEYS Feb. 8, 1949. A. A. BROWN 2,461,308
MACHINE FOR ASSORTING EGGS ACCORDING TO WEIGHT
Filed April 4, 1947 2 Sheets-Sheet 2
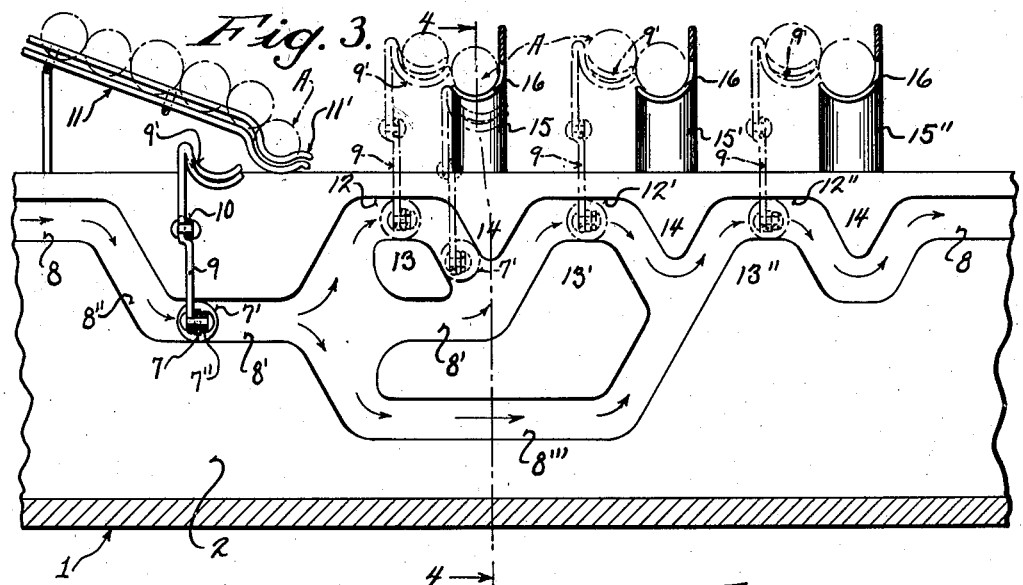
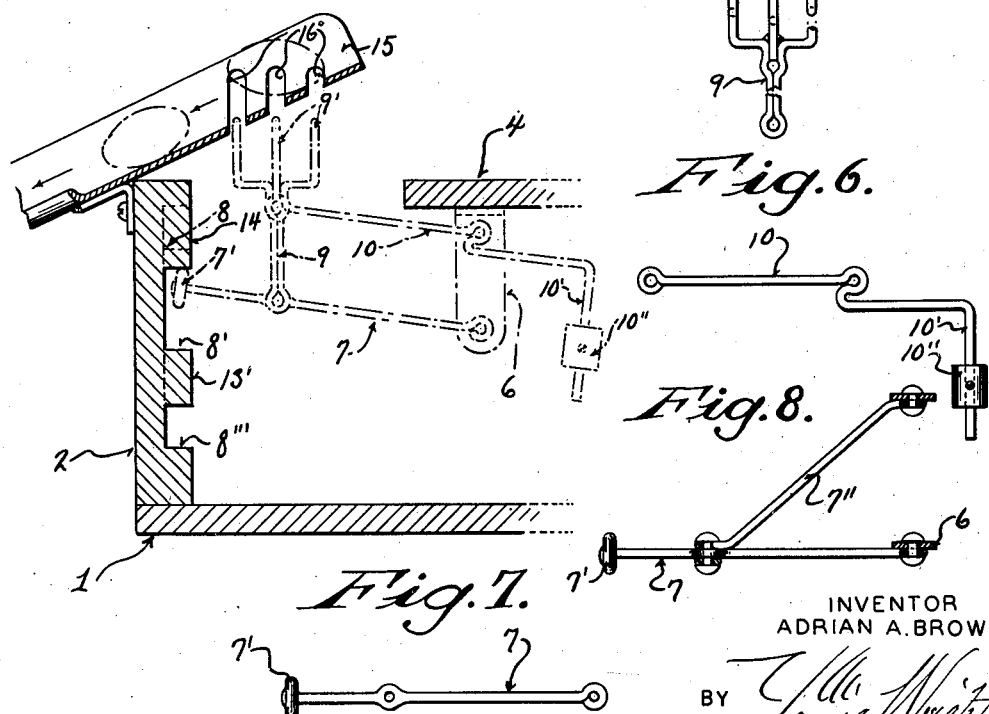
INVENTOR
ADRIAN A. BROWN
BY 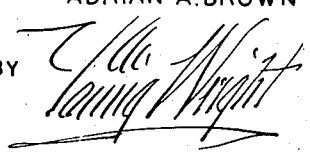
ATTORNEYS Patented Feb. 8, 1949

2,461,308

UNITED STATES PATENT OFFICE 2,461,308

MACHINE FOR ASSORTING EGGS ACCORDING TO WEIGHT

Adrian A. Brown, Lake Geneva, Wis.

Application April 4, 1947, Serial No. 741,185

1 Claim. (Cl. 209—121)

My invention refers to grading machines for eggs, spherical fruits or vegetables and it has for its primary object, to provide a fixed circular cam track having a motor driven rotary table nested therein, the same carrying a counter-balanced weighing scale for eggs or the like, adapted to receive eggs of various sizes one by one from an inclined runway and to selectively deliver the same to two or more collecting shutes in assorted sizes or weights, such as light, medium or heavy egg.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a plan view of an egg sorting machine embodying the features of my invention, parts being broken away to more clearly illustrate structural features.

Fig. 2 is a longitudinally sectional view of the same, the section being indicated by line 2 of Fig. 1.

Fig. 3 is an enlarged, fragmental, sectional elevation illustrating one group of eggs weighing or sorting mechanism, the section being indicated by line 3—3 of Fig. 1.

Fig. 4 is a detailed cross sectional view through the cam track and associated mechanism, the section being indicated by line 4—4 of Fig. 3.

Fig. 5 to Fig. 8 inclusive illustrates the detailed structural features of the egg weighing scale mechanism.

Referring by character to the drawings, 1 represents a skeleton frame, having upstanding therefrom a circular band 2.

The frame has centrally journaled therein a spindle 3 carrying a table 4 and the lower end of said spindle is in gear connection with a motor 5, all of which parts are suitably mounted within the frame.

For the purpose of increasing the capacity of the machine, I have shown the same equipped with three groups of egg sorting mechanisms, associated with the fixed band 2 and table 4, it being understood that such groups may be variated indefinitely, and for simplicity in disclosing the invention, I will describe specifically one of these groups.

Referring especially to Fig. 1 and Fig. 2 of the drawings, the bottom face of the table has extending therefrom an ear 6, to which is pivoted a scale actuating arm 7, the free end of which arm carries a roller 7' that is adapted to travel in a cam track 8 formed in the circular band 2, the same continues throughout said band.

Pivoted to the free end of the actuating arm 7 is a shank 9, which shank terminates at its upper end with a series of three bowed fingers 9', which fingers form a skeleton cup for the reception of a single egg A, as indicated in dotted lines, Fig. 2 of the drawings.

The egg weighing mechanism is completed by a controlling lever 10, which is pivotally connected to the upper shank portion of the fingered cup, and said lever intermediates its ends, is pivoted to the ear 6, the free end of 10' of said lever being extended downwardly from the pivot, and the same is provided with an adjustable counter balanced weight 10", as best indicated in Fig. 2 of the drawings.

Owing to the coupling connections of the weighing mechanism, it will be noted that the fingered egg carrying cup is capable of moving up or down in a vertical direction due to the link connections, this movement being indicated in dotted lines, Fig. 4.

As best illustrated in Fig. 1 and Fig. 3 of the drawings, the stationary band 2 has fitted thereon a downwardly inclined skeletonized runway 11, the lower end of which terminates with a series of bowed egg receiving fingers 11', which fingers are in the line of travel of the cup fingers 9' when the same are rotated by the table as the arrow indicates in Fig. 1 of the drawings.

Thus, it will be noted, when the cup fingers 9' are in approximately the same horizontal plane as the fingers 11' of the runway, the said groups of fingers will intermesh, and as indicated in dotted lines, Fig. 3, the cup fingers will strip an egg A from the end of the runway 11.

Referring now especially to Figs. 1 to 3 of the drawings, the egg weighing scale is positively controlled by the band cam track 8, which cam track is interrupted by a series of three upwardly bowed loops 12, 12' and 12", the same communicating with the main medium egg cam track by a lower track section 8', which track section is merged into the main track section 8 by a downwardly inclined throat 8". The lower medium track section 8' may be referred to in general as a medium weight track section, the said medium track section being extended horizontally to communicate with the bottom end of the loop 12'.

The medium track section 8' also communicates with the downwardly inclined leg portion of the loop 12, and said loop is developed by a switch block 13, there being a somewhat similar switch block 13' associated with the loop 12' and a third switch block 13'' associated with the last of said loops 12'', it being understood that the rear leg of said loop 12'' is extended downwardly and upwardly to finally merge into the main cam track 8. This final downward and upward direction of the track loops is developed by depending V-shape block 14 as indicated in Fig. 3 of the drawings.

The lower portion of the intermediate switch block 13' forms one wall of a looped track channel 8''', which track channel serves to control the movement of heavy eggs and its receiving throat is upwardly inclined to communicate with the medium weight channel 8'.

For the purpose of discharging different grade eggs, from light to heavy, I provide three downwardly inclined spaced shutes 15, 15' and 15'', which shutes at their receiving ends, are formed each with triple slots 16, which slots are aligned with the direction of travel of the weighing scale cup fingers 9' when said cup fingers are at their highest plane due the fact that the roller controlled arm 7' of the scale mechanism is traveling through the highest point of the upwardly bowed series of loops.

As best illustrated in Fig. 8 of the drawings, the scale actuating arm 7 is provided with a tie brace 7'', which brace is also pivoted to the table in axial alignment with the actuating arm pivot.

From the foregoing descriptions, it will be apparent, should it be desired to simply grade the eggs light and heavy, the cam track would be provided with only a pair of the upwardly bowed cam track section 8' loops.

As clearly illustrated in Fig. 3 of the drawings, the device is arranged to sort three grades of eggs to-wit: light, medium and heavy.

These mingled sizes or weights of eggs, will be disposed indiscriminately upon the runway 11, with the last egg, as indicated by the character A, nested within the upwardly curved end fingers 11'.

As the fingered cup, through its cam track, travels through the end fingers of the runway, said cup will pick up the egg, and in the event said egg is "light in weight," when the cup and scale actuating arm 7 reached the mouth of the first loop 12, the said cup will rise to the position indicated in dotted line, whereby, in its further travel, it is dropped slightly and deposits this light egg, into the first collecting shute 15. It should be noted that the fingered cup 9' travels through the slots 16 in the chutes when an egg is stripped from said fingered cup.

When a second scale connected fingered cup 9' reaches the runway 11, another egg is picked therefrom, and should this second egg be of medium weight, the cup and associated scale actuating arm will travel in a straight line to the second loop 12', whereby the said egg will be delivered in the shute 15' for collecting medium sized eggs.

It will be noted in this last mentioned operation, should the medium egg be a trifle lighter or heavier, the associated flared mouths of the switch block 13 and block 13' will engage the actuating lever roller and thus, positively deliver said roller into its proper channel.

When a third empty egg cup reaches the runway 11, it will pick up an egg, and in the event that this egg is of "heavy weight," as the actuating scale arm reaches the mouth of the loop track 8''', it will by gravity drop into said loop channel whereby the heavy egg is delivered to the sorting or collecting shute 15'', thus the graded eggs, which are discharged from the three collecting shutes, may be quickly and properly graded as to their weight.

It follows that the three groups of sorting mechanism associated with the machine may all, simultaneously, be operated to quickly sort a large volume of ungraded eggs.

I claim:

An egg grading machine comprising a rotary table, a fixed band about the table, a main cam track carried by the band interrupted by a lower medium egg track section and a heavy egg track section upon a lower plane than the medium track section, the medium and heavy track sections communicating with a series of cam loops, a counter balanced egg weighing scale arm pivotally mounted upon the table, having a roller engaging the cam track, a fingered cup extending upwardly from the scale arm, a downwardly inclined runway carried by the band, the runway being provided with upwardly curved bottom fingers in the path of travel of the cup fingers, and a downwardly inclined series of collecting chutes carried by the band, positioned rearwardly of each cam loop, the said chutes being slotted at their upper ends to permit travel therethrough of the cup fingers, whereby a light weight egg may be delivered to the first chute, a medium weight egg to the second chute and a heavy weight egg to the third chute, the roller carrying scale arm and associated cup being caused to travel upward and downward through the first, second and third cam loops to selectively sort three grades of eggs.

ADRIAN A. BROWN.

REFERENCES CITED

The following references are of record in the file of this patent:

UNITED STATES PATENTS

| Number | Name | Date |
|---|---|---|
| 972,026 | Rowand | Oct. 4, 1910 |
| 1,020,981 | Hebrank | Mar. 26, 1912 |

FOREIGN PATENTS

| Number | Country | Date |
|---|---|---|
| 347,166 | Britain | Apr. 23, 1931 |